United States Patent [19]

Misawa

[11] Patent Number: 5,644,588
[45] Date of Patent: Jul. 1, 1997

[54] MICROFINE LIGHT SOURCE

[75] Inventor: Hiroaki Misawa, Tokushima, Japan

[73] Assignee: Research Development Corporation of Japan, Saitama, Japan

[21] Appl. No.: 411,145

[22] Filed: Mar. 27, 1995

[30] Foreign Application Priority Data

Mar. 26, 1994 [JP] Japan ................ 6-079600

[51] Int. Cl.$^6$ .................................. H01S 3/06
[52] U.S. Cl. .................. 372/66; 372/54; 372/70
[58] Field of Search .................. 372/42, 66, 70, 372/69, 54

[56] References Cited

U.S. PATENT DOCUMENTS

| | | | |
|---|---|---|---|
| 4,139,342 | 2/1979 | Sheldrake et al. | 372/39 |
| 4,641,312 | 2/1987 | Schaefer et al. | 372/54 |
| 5,212,382 | 5/1993 | Sasaki et al. | 250/251 |
| 5,283,417 | 2/1994 | Misawa et al. | 219/121.85 |
| 5,308,976 | 5/1994 | Misawa et al. | 250/251 |
| 5,356,667 | 10/1994 | Hench et al. | 372/39 |
| 5,359,615 | 10/1994 | Sasaki et al. | 372/39 |
| 5,367,160 | 11/1994 | Ishikawa et al. | 250/251 |
| 5,393,957 | 2/1995 | Misawa et al. | 219/171.85 |
| 5,448,582 | 9/1995 | Lawandy | 372/42 |

*Primary Examiner*—Leon Scott, Jr.
*Attorney, Agent, or Firm*—Wenderoth, Lind & Ponack

[57] ABSTRACT

A microfine light source is provided by a non-spherical particle containing a dye, which is irradiated with a laser beam under conditions that the particle emits light at a plurality of frequencies. A micromemory sensor which employs the light confinement properties of these non-spherical particles is also provided. The microfine light source is applicable to new physical and chemical processes, the processing and modification of particles, and to photon STM.

6 Claims, 6 Drawing Sheets

MICROFINE LIGHT SOURCE

FIELD OF THE INVENTION

The present invention relates to a microfine light source and, mope specifically, to a method for forming and applying the microfine light source which is useful for micromemory sensors, or in fields of physical and chemical processes and electronics as a new method for manipulating particulates.

PRIOR ART AND PROBLEMS

The practice of irradiating laser beams to particulates for trapping has been conventionally known. The instant invention has made it possible to upgrade this laser-trapping method to a level where non-contact, nondestructive free manipulations of particulates of micrometer order are feasible.

In this laser trapping, the particulates trapped irradiated with light beams of energy in the order of several tens to hundreds of $MW/cm^2$. It is expected that in such a system, reactions in nonlinear chemistry occur readily. Another way of saying this is that compared with the case where a container of cm order is used, these extreme conditions can be created more easily. This is also one of the most distinctive features of microfine chemistry, which can be utilized to induce chemical reactions measurable only by means of a micrometer.

From this point of view, studies have been made on the advanced use and more extensive application of laser technology for manipulation of particulates. As a result, several new developments have been achieved, but in the course of these developments, there have boon some improvements yet to be done. Particularly important of these has been the formation of a microfine light source for particulates.

The reason is that if a microfine light source of micrometer order becomes available and can, like laser, produce a highly monochromatic and coherent beam of light, then it will be able to serve as important technology in the realization of a microfine chemical plant. Also in optical measurement, represented by photon STM (NSOM), there have been a great deal of studies on the techniques by which beams of light are confined to submicron space, the size of which is smaller than that of the wavelength thereof. A microfine light source can also find its application in this field. The recent studies on microfine light sources include those on the oscillation by dye laser of droplet polymer-latex particulates. With spheres of μm order as cavities, oscillation of a mode called Whispering Gallery occurs.

Several theories have been derived concerning these microfine light sources. Examples include: a theory of an electromagnetic field in a microsphere of dielectric material was announced early in the 20th century. It is known as the theory of Mie scattering. Immediately thereafter, Debye used a similar theory to derive the force (radiation force) exerted by an electromagnetic field upon microspheres of dielectric material. This constituted a theory based on which Ashkin showed later that in laser trapping, there are found ripple structures in the particle size and rate of dependency on wavelength (as with Whispering-Gallery Mode). Subsequently, this phenomenon was referred to as Whispering-Gallery Mode by Rayleigh. This theory is known as Rayleigh theory, Mie Debye theory or Lorenz-Mie theory in the field of laser-excited oscillation of particulates.

This idea was corroborated by Carrolls, et al. of Bell Institute in 1961. They experimented with laser-excited oscillation of microspheres employing as samples crystals of $CaF_2$ $Sm^{+1}$ that were polished into several mm (not μm) of spheres (in liquefied hydrogen), and as pumping light, high-voltage xenon flash lamp (peak power:50 $W/cm^2$). From the dependency of the intensity of light emitted upon that of pumping light, they confirmed that the emission in question is of induced type. This experiment was outstanding enough, but for some reason or others, no similar attempts followed. The subject came to receive attention again in the latter half of the 1970s, when laser started to gain its popularity. Since around this time, numerous reports have been presented. First of all, it was experimentally shown that fluorescent spectra of dye doped in spherical particulates with a diameter of several tens of μm come to have a mode structure due to resonance.

Using column-shaped fibers, other attempts were made to measure a similar mode structure. These two experiments were, however, concerned with the mode structure of spontaneously emitted beams of light. They were nothing more than the experiments, at best on the same level as the observation of fluorescence through ethanol, and did not deal with laser oscillation (induced emission). The first report on laser oscillation with particulates of um order came from Teng, et., al. in 1984. The samples used then were droplets in the air of ethanol containing rhodamine 6G($10^{-4}$–$10^{-3}$M)*. These droplets were prepared with a vibrating orifice whose frequency was used to adjust particle sizes. In this test, droplets with particle size of up to 60 μm were employed, and, using an argon ion laser (514.5 nm), the pumping light was restricted to 200 μm. Measurements were conducted on each droplet in such a manner that droplet after droplet was pumped at a certain timing while it was dropping. Induced emission was confirmed in this case, because the ratio of the peak strength of a mode to that of background (spontaneous emission light) was dependent upon the intensity of the pumping light and a relaxation oscillation was measured through time-division measurements in the order of μsec. The reported data seemingly contained not only those of dye laser oscillation, but those of ethanol-induced Raman scattering. In fact, just shortly following this, induced Raman scattering (the one which occurs due to the feedback of microsphere cavities) in microdroplets (alcohol or water) were reported. This has a definite mode structure, and can be considered to be a sort of Raman laser.

Thereafter, for dye laser oscillation, Lin, et. al. examined the dependency of laser-oscillated spectra on particle size [water drop containing rhodamine 590 ($10^{-4}$–$10^{-3}$M) 40–60 μm, Q switched YAG 532 nm, 20 ns]. Quian et al. presented photographs which enabled us to observe the process of laser oscillation. Bismas et al., moreover, effected nsec-order time-division measurements of laser oscillation, clearly showing relaxation oscillations. For induced Raman scattering, however, Quian et al. measured $CCl_4$ droplets, and nsec-order time-division measurements were conducted earlier than for dye laser oscillation. Since 1990, there have been a great deal of studies on the induced Raman scattering of microdroplets, but subsequently with little progress.

However, in all the examples cited above, except for the observation of spontaneous emission light (fluorescent light), droplets were observed in the air.

Although they were of academic importance, these studies were entirely insufficient in the application and development of the light source as practical technology. In practical terms, mere confirmation of light emission of droplets in the air and the laser oscillation thereof was not sufficient enough to permit the technology to be applied to a microfine reaction field and to photon STM as particulate manipulation method.

Under these circumstances, the present inventor trapped particulates with laser, and irradiated laser thereto, thereby exciting laser oscillation successfully and providing a method for using laser oscillation to form a microfine light source (Japanese Patent Provisional Publication No. 175616/93).

This formation of microfine light sources received attention as being innovative by the technological standards heretofore, permitting the application thereof to the fields of microfine reaction and to photon STM.

However, to proceed with further investigations, the studies made by then on the method for forming microfine light sources had suffered from restrictions: they had been concerned only with spherical particulates, and less than sufficient considerations had been given to the optical resonance effect of particulates.

For this reason, the instant invention has been made considering the foregoing status of research and development that were made heretofore. Making further improvements on the manipulation method of particulates by laser and taking notice of optical resonance effects, the present invention has the objective of providing a new method for forming microfine light sources useful in the application to microfine reaction fields, and a method for manipulating micro sensors end particulates using the microfine light source.

SUMMARY OF THE INVENTION

As a means for solving the foregoing problems, the present invention provides a microfine light source characterized by radiating laser beams to non-spherical particulates in which laser dye is doped, and thereby causing them to emit light.

This invention also provides a micro memory sensor made by light continent technology using optical resonance effect, a method for trapping non-spherical particulates in a liquid medium and irradiating them with laser beams, and a method for manipulating light-emitting particulates three dimensionally and irradiating other particulates for the processing and modification thereof.

DETAILED DESCRIPTION OF THE INVENTION

Figure 1:
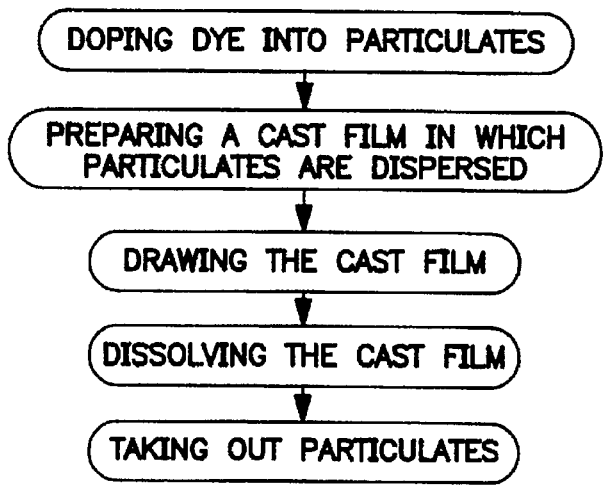
FIG. 1 shows a process diagram illustrating the preparation process of nonspherical particulates according to the present invention.

According to the present invention, laser dye has been doped in spheroidal particulates or non-spherical particulates, which are irradiated with laser beams to emit light. The present invention permits laser oscillation.

In this case, particulates may be provided in a plurality of groups, and may be used in any arbitrary combination of those with and without laser dye doped therein. There is no specific limitation to the kind of particulates used: as long as laser dye can be doped, any type may be employed.

The non-spherical-shaped particulates with dye doped therein may be readily produced by, usually, impregnating dye into spherical particulates, making them dispersed in a film and drawing or otherwise transforming the film. Here is a more detailed description of the process.

(1) Impregnation of dye

Take, as an example, the impregnation of dye into polymer particulates. Dye is dissolved in an appropriate organic solvent which is a poor solvent against the particulates to be used and natural or synthetic organic polymer particulates are immersed in the solution. The particulates are swollen to some degree with the organic solvent, with which the dye enters the particulates. The particulates are then filtered using a micropore filter and allowed to dry, thus giving the particulates in which dye is doped. Pertaining to when to impregnate dye, there are two methods available: impregnating dye into the particulates after and before they are transformed.

(2) Transformation of particulates

Now, let us take, an example where spherical-shaped polymer particulates are transformed into spheroidal (a football-shaped) particulates. By means of water-soluble polymers, particulates insoluble to water are allowed to be dispersed in a polymer aqueous solution of adequate concentration, preparing the cast film thereof. It is then drawn to a proper tensile ratio in an oil bath maintained at high humidity. The polymer particulates will be subjected to affine transformation under the inherent circumstances thereof. After they are transformed, the water-soluble polymers are dissolved and filtered, giving spheroidal-shaped particulates.

Whether transformation can occur depends on drawing temperature. At room temperatures, polymer particulates are usually in glass form, and hence cannot be drawn. For the glass to be drawn, it is required to raise the drawing temperatures to higher than the glass transition temperature: Tg (e.g., 80°–120° C. for poly-methyl methacrylic acid ester: PMMA, and 82° C. for polystyrene: PSt). For the particulates to become transformed into spheroidal shape, the cast film thereof must be elastic. PVA, for instance, satisfactorily meets these requirements when Tg is 90°–140° C.

The foregoing process of preparation of spherical-shaped particulates is illustrated in FIG. 1. The procedures for taking out non-spherical-shaped particulates is shown in greater detail in FIG. 2.

The non-spherical-shaped particulates applicable to this invention are not restricted to spheroidal particulates, nor are the preparation method thereof limited to the aforestated procedures. Various other methods can be applied.

The microfine light source produced according to the present invention can be utilized for various applications: the physical/chemical alteration and modification of other co-existing particulates, or the applications as display devices, optical devices, optical memory devices, optical sensors, and other electronic devices, or as photon STM. The particulates to be used in the instant invention may include organic matter as well as cells of living matter and virus.

The microfine light source of the present invention is effective as a microfine resonator having its specific optical resonance effect. It can also be used to constitute a micromemory sensor due to light confinement technology.

Light can be emitted either by the irradiation of trapping laser beams in liquid, or by the irradiation of pulse laser and other forms of laser with that trapping laser.

Depending on the kinds of these laser beams, the power thereof, irradiation method and the types of dye, the present invention becomes possible in various configurations.

Now, embodiments will be given for more detailed descriptions of the present invention.

EXAMPLES (1) Doping of dye on particulates

The particulates were dipped for a day into organic solvent in which dye was dissolved and filtered with a micropore filter (having 8 μm pores). Here, for polymethylacrylic acid ester (PMMA; Soken, MP-2700M, D=120 μm), a solution (approximately $2 \times 10^{-2}$ mol/l saturated solution) in which rhodamine B (RhB: Exciton, R610 Chloride, MW479.02) was dissolved into methanol was used. For the polystyrene (PSt: Polysciences Inc. Polybead Polystyrene 45.0 μm, 2.5% solid-Latex D=41.17 μm SD=7.613 μ), a solution ($2 \times 10^{-4}$ mol/l saturated solution), in which Nile Red (NR) (Aldrich Chem. Co., MW318.3) was dissolved into acetone was employed.

(2) Production of spheroidal particulates

Football-shaped particulates were produced by the application of the following sequential procedures.

1) Production of a cast film in which the particulates are dispersed

With 22.5 g of the resulting particulates dispersed into distilled water, 2.5 g PVA (gravitational concentration:10%) (Nakaraitex) was dissolved therein.

For PVA, the degree of polymerization about 500 was applied. This is because PVA will get dissolved easily, when it is stirred at 50° to 70° C. for scores of minutes. After being drawn, the cast film produced under the condition will be dissolved easily in water, making it easy to produce particulates.

The cast film was produced in such a manner that the PVA aqueous solution in which the particulates were dissolved was placed horizontally on slideglass (MATSUNAMI MICROSLIDE GLASS, Thickness 0.8–1.0 mm, Pre-cleaned, 76×26 mm) in an amount of 5 ml using a Pasteur pipette, and dried in the normal temperature. The thickness of the dried film was about 0.15 mm when measured with a micrometer.

2) Drawing of cast film

A small piece of film in a size of 10×70 mm which was cut off from sufficiently dried film was fixed on a drawing machine, and drawn at 120° C. at a required tensile rate. The drawing was done by manually operating the small piece of film at a mean speed of 3–5 cm/s in an automatically temperature-controlled oil bath (using silicon oil: Toray Dow Corning Silicon Co. SRX310, 1.0 Kg). The film was drawn from 6 cm to 7.2 cm (at a drawing rate of 1–2). Thereafter, the drawn film was adequately cooled at room temperature, and the oil adhered thereon was removed (the oil was first wiped off with paper, and then, due to its solubility in water, PVA was clearly removed with hexane.)

3) Collecting transformed particulates from the drawn film

Figure 2:
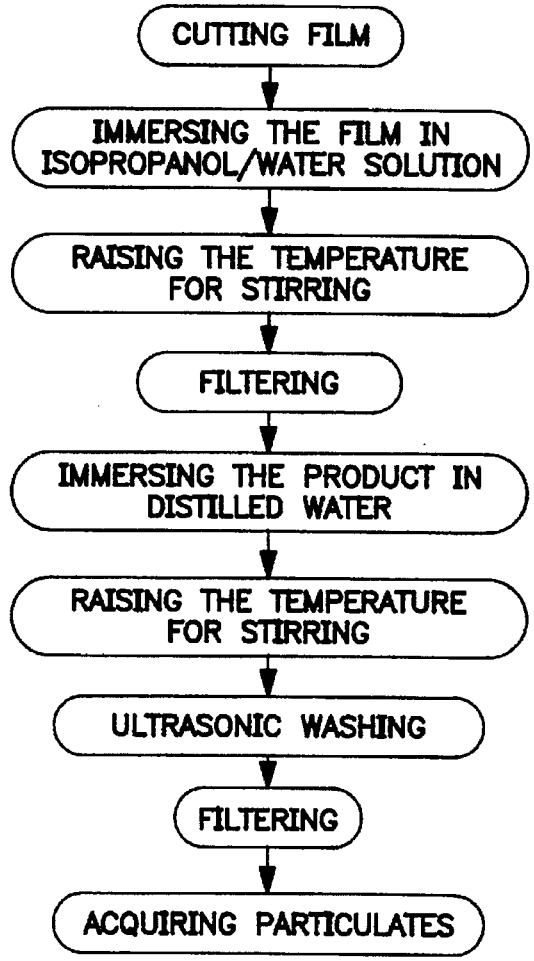
FIG. 2 shows a process diagram showing the removal of the particulates as in FIG. 1.

Football-shaped particulates were obtained in the following procedure: first the film was taken out of the drawing stand main body. The portion near the clamping part of the film was removed since the strain incurred was somewhat different from that incurred around the central portion, and the rest of the film was immersed for approximately 10 hours as indicated in FIG. 2, in a mixture of 30/70% (V/V) isopropanol/water (200 ml per four sheets of film), allowing the film to get gelatinized. The temperature of the solution was, thereafter, raised up to 80°–85° C., temperatures at which PVA is dissolved, causing the particulates dispersed in the film to be separated. Then, a micropore filter (having 8 μm pores) was used to filter the mixture of isopropanol/water; in this case, in order to clean the particulates, distilled water was poured with the filter fixed. The resultant particulates were stirred for approximately one hour in the distilled water (about 200 ml per four sheets of film) whose temperature was raised to 80°–85° C., at which PVA was dissolved. Subsequently, the PVA adhered on the particulates was removed with a ultrasonic washer. The resulting product was filtered with a filter (having 8 μm pores), then washed and filtered with distilled water to give football-shaped particulates.

The axial ratio of the football-shaped particulates thus obtained were found to be in good agreement with the drawing ratio of the film.

Figure 3:
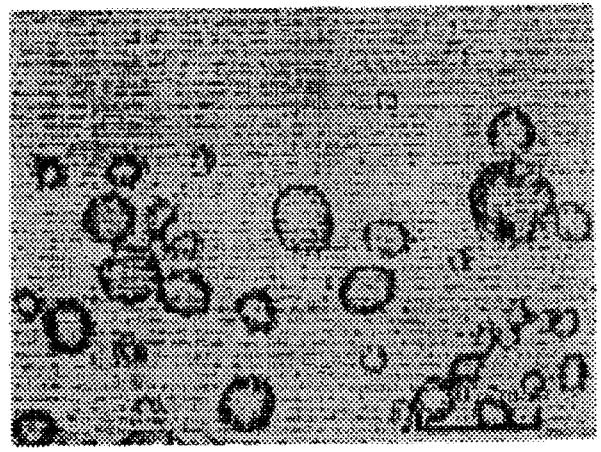
FIG. 3 shows nonspherical particulates given as one embodiment.

FIG. 3 shows those PMMA particulates having an axial ratio of 12:10 (1.2) which were doped with RhB ($2 \times 10^{-2}$ mol/l) and drawn at a drawing ratio of 1.2.

Figure 4:
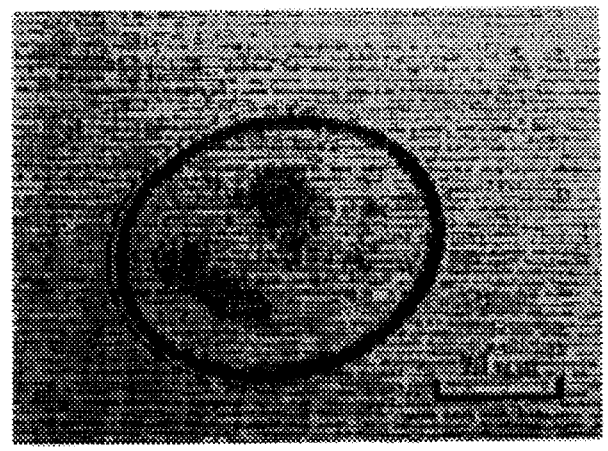
FIG. 4 shows nonspherical particulates given as one embodiment.

FIG. 4 is PSt particulates having an axial ratio of 56:47 (1.19) which were doped with NR ($2 \times 10^{-4}$ mol/l) and produced by being drawn at a drawing ratio 1.2.

In the same way, PMMA nonspherical particulates may be obtained by doping in rhodamine 6G.

4) Irradiation of spherical particulates by laser beams

Figure 5:
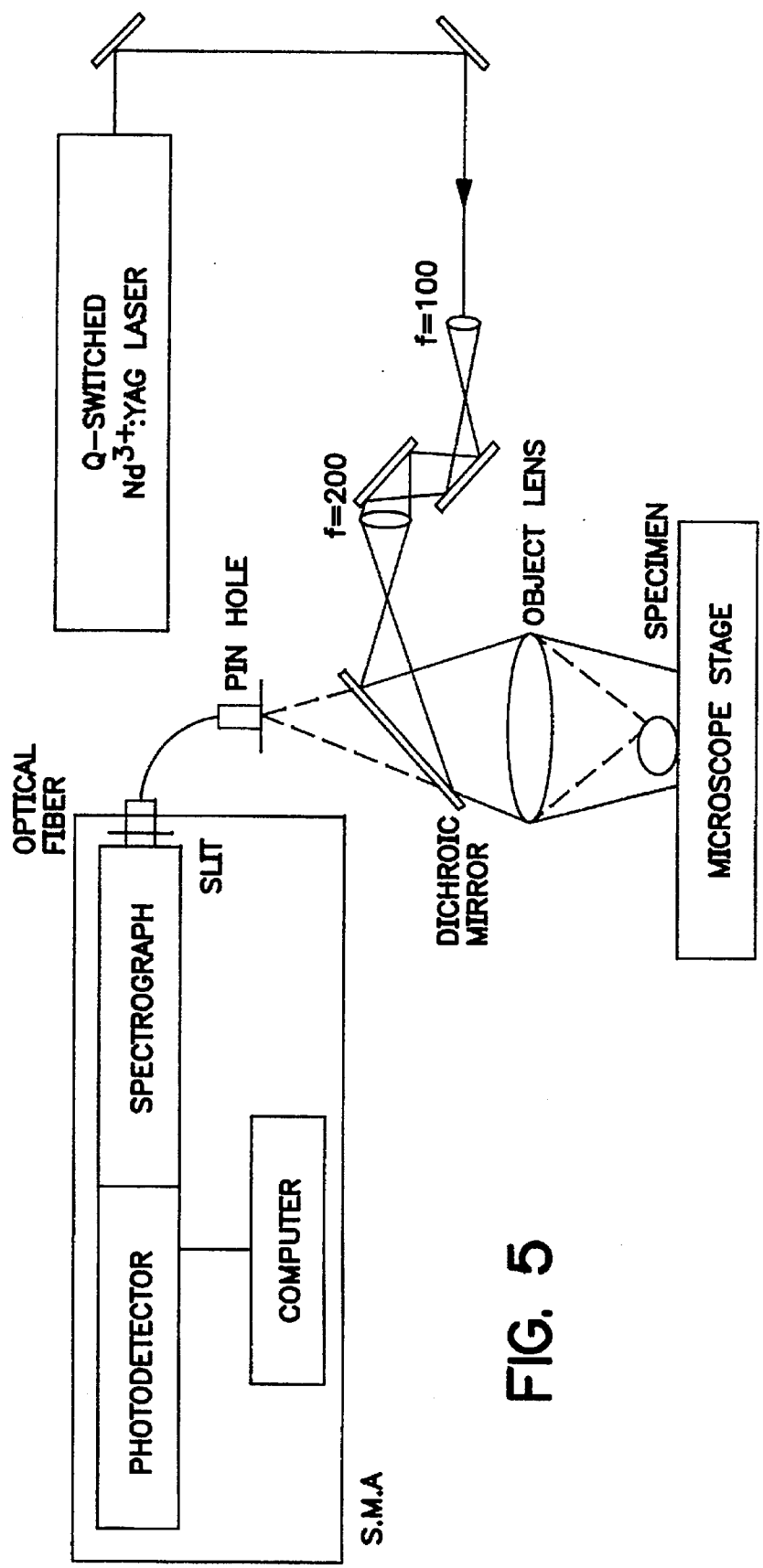
FIG. 5 shows a laser irradiation system.

FIG. 5 is an example of the irradiation of laser beams on the nonspherical shaped particulates and the construction of a system for laser oscillation induced thereby. For pumping laser, a Q switch Nd: the secondary higher harmonics (532 nm, –30 ps, 10 mJ/pulse, 10 Hz) of YAG laser was used. The laser beam was introduced into a microscope (Nikon Optiphot XF), focused on a particulate with an object lens (×40,NA=0.85). Associated with the above process, the object lens was put out of focus into a defocusing state so that the whole area of one piece of particulate was able to be irradiated uniformly. The emission of light from the particulate was kept focused on a pin hole on the plane of image-formation by the object lens, so that it was enabled to execute spectra measurement on the image incorporating high sensitive multichannel spectrophotometer (Hamamatsu Photonics, PMA10, containing double tier MCP, and the resolution –2 nm). In this case, laser trapping may be done in liquid media. For the purpose of the above, for instance, CWNd:YAG laser (spectron SL902T, wavelength:1064 nm, straight line polarized light) might be used as the trapping laser beam. This laser beam was circularly polarized with a λ/4 plate, and was divided with a polarized beam splitter. These two laser beams were polarized into two axial directions by means of two sheets of galvanomirror (GSZ Q325 DT) respectively. They were then made coaxial with a polarized beam splitter.

These laser beams were further fed into a microscope together with the pumping laser beam coaxially to be focused on the specimen. The size of the focused spot was –1 μm. The two beam-focused spots could be freely moved on the surface of the specimen using a galvanomirror controlled by a computer (NEC PC9801RA). The status of the particulate laser emission could be observed by a CCD camera and by a video image display.

Figure 6:
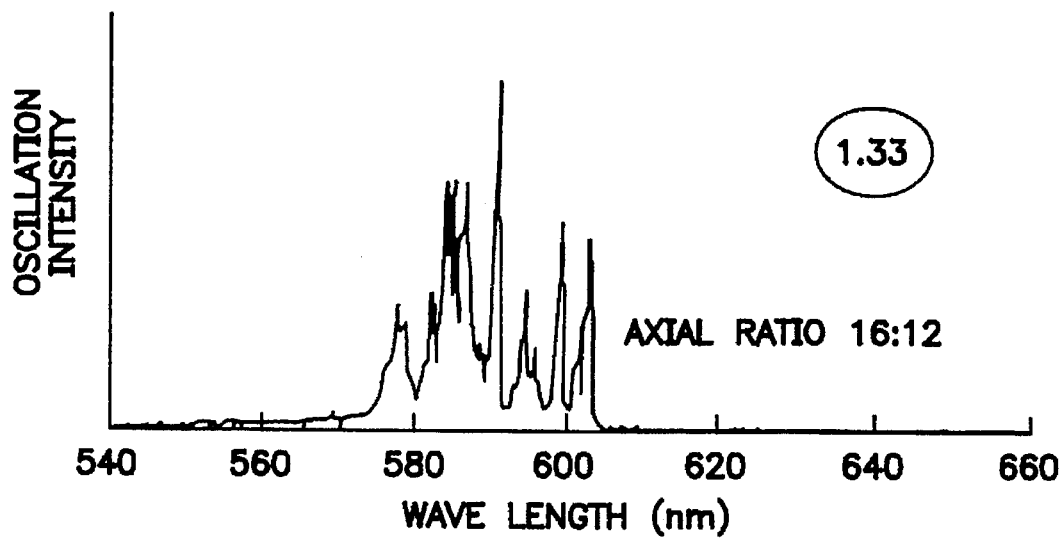
FIG. 6 shows oscillation spectra as an embodiment.
Figure 7:
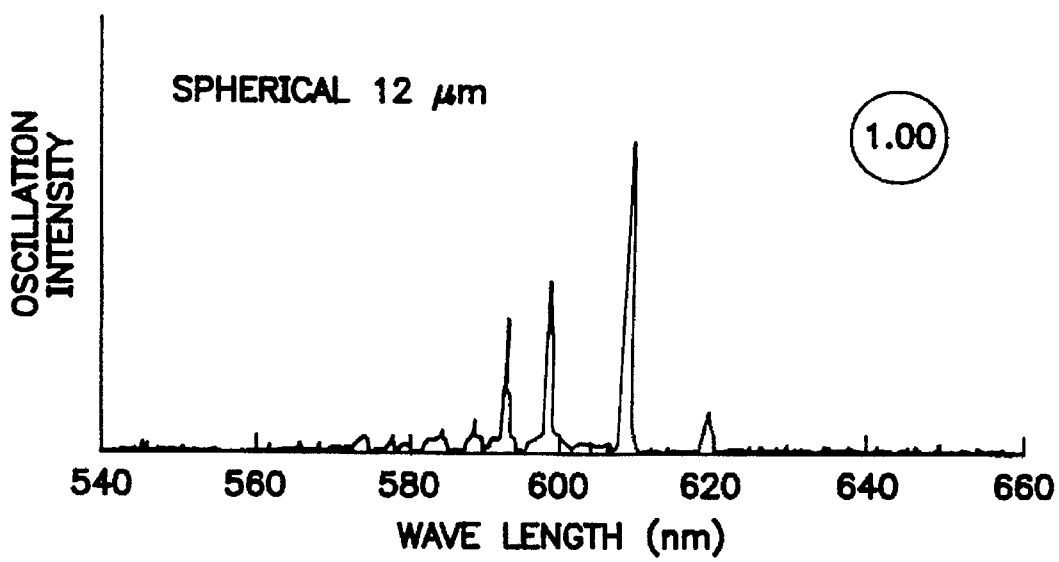
FIG. 7 shows the oscillation spectra of spherical particulates as a comparative example.
Figure 8:
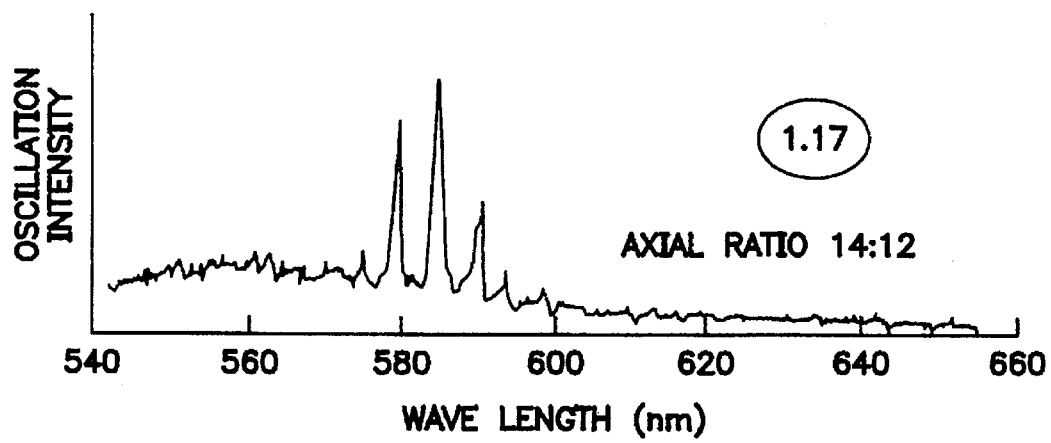
FIG. 8 shows oscillation spectra as an embodiment.
Figure 9:
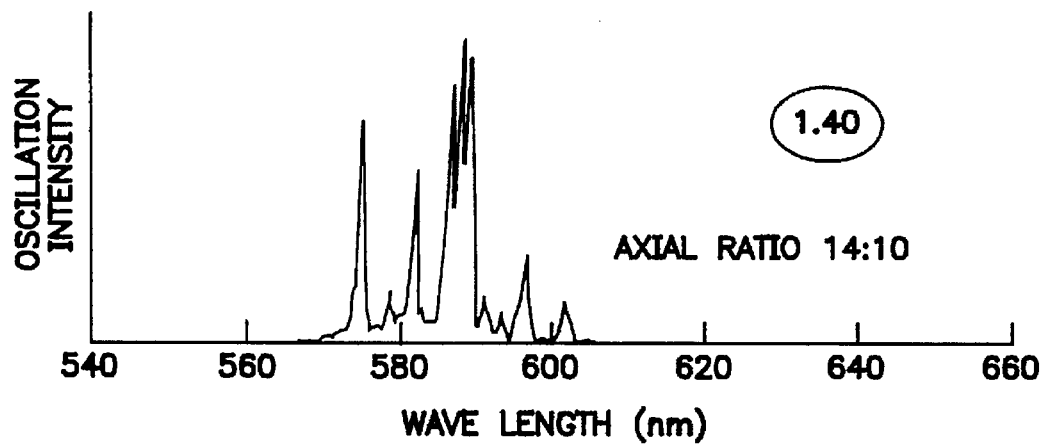
FIG. 9 shows oscillation spectra as an embodiment.

FIG. 6 shows the radiation spectra of the football shaped spheroidal particulate composed of the PMMA particulates (with a longer axis of approx. 16 μm) doped with Rhodamine 6G produced by the sequential procedures 1) to 4) above and having an axial ratio 16:12. FIG. 7 is provided for comparison, showing the radiation spectra for 12 μm diameter of spherical particulates. FIG. 8 indicates the radiation spectra of particulate having an axial ratio 14:12, and FIG. 9 shows the radiation spectra of particulates with an axial ratio 14:10.

Figure 10:
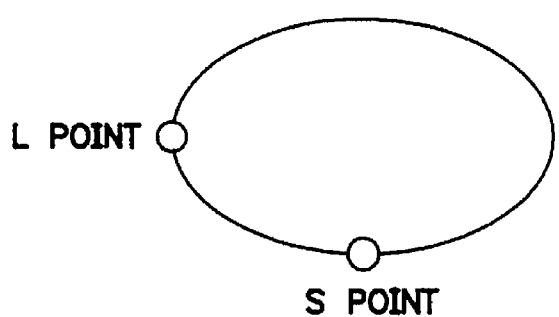
FIG. 10 shows the locations of excitation.
Figure 11:
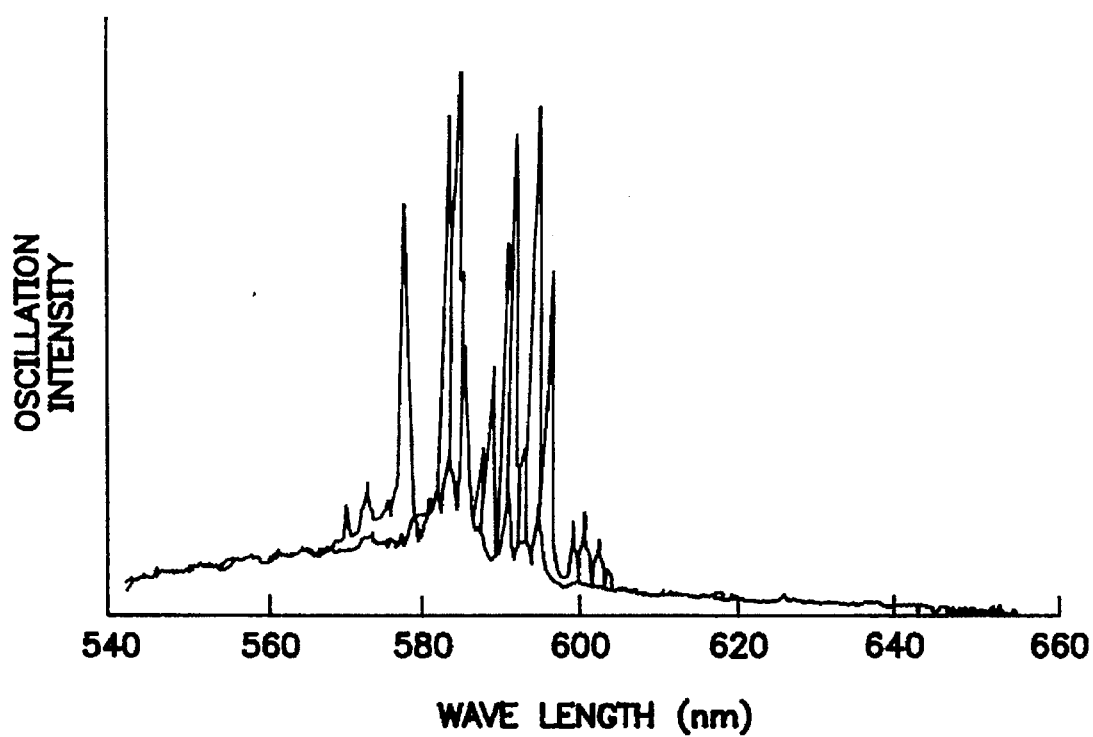
FIG. 11 shows oscillation spectra corresponding to the locations of excitation.

FIG. 10 shows the state where the excitation positions are taken on L point and S point of the spheroid. FIG. 11 indicates the difference of the radiation spectrum in terms of the excitation positions taken.

From the above, it can be seen clearly that:

1) Compared with the spherical particulates, the laser oscillation peak will appear on the shorter wave length side for the nonspherical particulates.
   Threshold value of laser emission is high.
2) Compared with the spherical particulates, the number of peaks of laser emission will be increased for the non-spherical particulates.
   This has made it possible to form the memory on the nonspherical particulates more easily and more deeply, compared with the spherical particulates, by effecting photochemical hole burning at room temperatures.
3) When the whole particulate is excited, the locations of the laser emission peak points will be in conformity with each other, irregardless of the position of observation.
4) The position of laser emission peak will vary depending on where excitation will occur.

As noted above, not only nonspherical-shaped particulates can be used to achieve microfine light sources, but light confinement due to optical resonance can be utilized to give a micromemory sensor.

As described in detail, the present invention permits the formation of a microfine light source based on light resonance effect. This is applicable to new physical and chemical processes that can be applied to sensors and memories, to the process and modification of particulates, and further to new developments of photon STM.

What is claimed is:

1. A microfine light source comprising a means for producing a non-spherical particulate doped with a laser dye and having a shape such that an axial ratio of a larger axis of the non-spherical particulate to an axial ratio of a smaller axis of the non-spherical particulate is greater than 1 and wherein the doped non-spherical particle emits light at an increased frequency and relative intensity upon irradiation with a laser beam due to the non-spherical shape of the particulate, such that there is a substantial increase in the number of laser emission peaks and wherein oscillation peaks occur at shorter wavelengths in the emission spectrum of said non-spherical particulate.

2. A microfine light source as in claim 1 wherein said non-spherical particulate has a football shape.

3. A method for generating a microfine light source comprising:
   (a) providing a non-spherical shaped particulate doped with a laser dye having an axial ratio of a larger axis to a smaller axis greater than 1; and
   (b) irradiating said non-spherical particulate with a laser beam so that light is emitted at an increased frequency and relative intensity due to said shape of said particulate such that there is a substantial increase in the number of laser emission peaks and wherein oscillation peaks occur at shorter wavelengths for said non-spherical particulate.

4. A method for trapping and stimulating a microfine light source comprising the steps of:
   (a) forming a non-spherical particulate doped with a laser dye which particulate is shaped such that an axial ratio of a larger axis to a smaller axis of the non-spherical particulate is greater than 1;
   (b) trapping said particulate dispersed in a liquid medium with a first laser beam; and
   (c) irradiating the trapped particulate with a second laser beam so that the light is emitted at an increased frequency and relative intensity due to said shape of the particulate such that there is a substantial increase in the number of emission peaks and wherein oscillation peaks occur at shorter wavelengths in the emission spectrum for said non-spherical particulates.

5. A method of making a non-spherical microfine light source comprising:
   (a) doping a laser dye into a plurality of polymeric water-insoluble spherical particulates;
   (b) combining the doped particulates with a water-soluble polymer dispersion to form a mixture thereof;
   (c) drying said polymer-particulate mixture to form a cast film thereof;
   (d) drawing opposing sides of the cast film to stretch the spherical particulates into a non-spherical shape;
   (e) dissolving the polymer drawn film to free the non-spherical particulates therefrom; and
   (f) isolating the non-spherical particulates.

6. A method according to claim 5 comprising stretching said spherical particulates to a football shape.

* * * * *